United States Patent [19]
Rasmussen

[11] 3,745,781
[45] July 17, 1973

[54] TIME DELAY CIRCUIT FOR A MOTOR COMPRESSOR SYSTEM

[75] Inventor: Ronald J. Rasmussen, Fort Smith, Ark.

[73] Assignee: Rheem Manufacturing Company, New York, N.Y.

[22] Filed: July 2, 1971

[21] Appl. No.: 159,129

[52] U.S. Cl............... 62/158, 62/227, 317/141, 318/484
[51] Int. Cl............................................. F25b 1/00
[58] Field of Search...................... 62/157, 158, 226, 62/227; 318/484, 487; 317/141

[56] References Cited
UNITED STATES PATENTS
3,563,048  2/1971  Barry ..................................... 62/158
3,631,685  2/1972  Young .................................... 62/158

Primary Examiner—Meyer Perlin
Attorney—Molinare, Allegretti, Newitt & Witcoff

[57] ABSTRACT

A time delay control circuit for an air conditioning system prevents restarting of the compressor motor until the pressure on the output side of the compressor drops below a fixed value. This arrangement prevents constant recycling of the compressor motor. The control circuit includes a thermostatically operated relay in series with a pair of parallel relays. One of the parallel relays is normally closed and opens whenever pressure on the high side of the compressor reaches a predetermined normal value. The other parallel relay is normally open and closes whenever power is supplied to the compressor motor. The motor power circuit includes a third normally open relay in series with the motor. The third relay is closed whenever the thermostatically operated relay and either of the parallel relays complete the control circuit.

5 Claims, 1 Drawing Figure

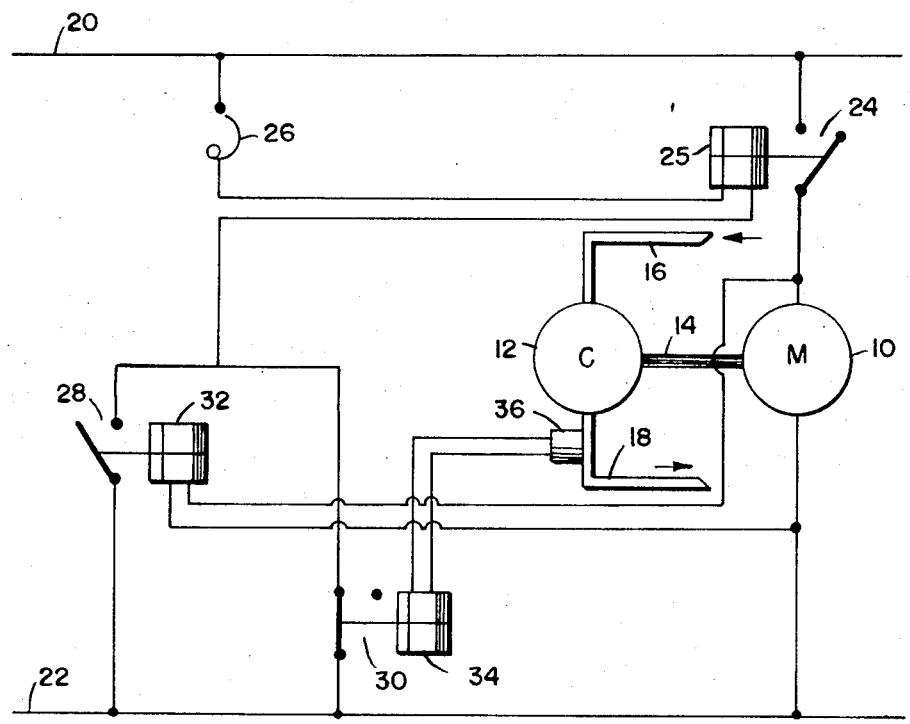
INVENTOR.
RONALD J. RASMUSSEN 3,745,781

TIME DELAY CIRCUIT FOR A MOTOR COMPRESSOR SYSTEM

BACKGROUND OF THE INVENTION

This invention relates to a time delay circuit for motor compressor combination wherein the motor is responsive to a control circuit which prevents constant starting and stopping or recycling of the motor compressor combination.

Typically, in air conditioning systems, an electric motor drives a compressor which, in turn, compresses a refrigerant material. The refrigerant is then expanded through coils to produce a cooling effect. Generally, operation of the motor which drives the compressor is controlled by a thermostatically responsive control circuit. Thus, when the temperature in a room goes above a certain level, a power supply is provided for the motor and the compressor commences operation. In the situation where the thermostatic device is especially sensitive, the control circuit and thus the motor may be constantly cycled. This cycling of the motor may cause burning of contact points and compressor motor failure.

Various protective circuit schemes have been suggested to prevent unnecessary recycling. However, these schemes are, in general, rather expensive. Heretofore, there has been no known low cost system for protection against constant cycling of a motor compressor system.

SUMMARY OF THE INVENTION

In a principal aspect, the present invention comprises a time delay circuit for a motor compressor system to prevent undesired cycling of the system. Included is a control circuit and a power circuit. The control circuit includes a normally closed environmental responsive relay in series with a thermostatically responsive relay and in parallel with a normally open second relay. The second relay is operative to close whenever power is supplied to the motor. The power circuit includes a normally open motor relay in series with the motor. The power circuit motor relay is closed by the control circuit.

Thus, it is an object of the present invention to provide an improved time delay circuit operative to delay restarting of the compressor motor in a motor compressor system.

It is a further object of the present invention to provide a time delay circuit which is economical to install or incorporate with conventional motor compressor systems.

Still another object of the present invention is to provide a time delay circuit operative to delay restarting of a motor subsequent to termination of power to the motor, whether the power cut-off is due to a failure in the power supply or due to a break in the control circuit controlling the power supply.

These and other objects, advantages and features of te invention will be set forth in greater detail in the description which follows.

BRIEF DESCRIPTION OF THE DRAWING

In the detailed description which follows, reference will be made to the drawing comprised of a single FIGURE illustrating schematically the motor compressor system and circuit of the present invention which is a type that may be used as part of a conventional air conditioning system.

DESCRIPTION OF THE PREFERRED EMBODIMENT

The motor compressor system includes a motor 10 operative to drive a compressor 12 by means of a shaft 14 from the motor 10. Typically, the compressor 12 includes a refrigerant inlet line 16 and a refrigerant outlet line 18, the flow of the refrigerant being indicated by the arrows. Thus, the compressor, as it is being operated by the motor, compresses the low pressure regrigerant from the inlet line 16 and discharges it through the high pressure outlet line 18.

Power is supplied to operate the motor through the power inlet lines 20 and 22. A first power line relay 24 is in series with the motor 10. The first relay 24 is normally open. The first relay 24 is closed by appropriate action of a control circuit providing current to a relay coil 25.

The control circuit includes a thermostatically responsive relay 26, a second normally open relay 28 in series with relay 26 and an environmentally responsive relay 30 in parallel with relay 28. Thus, the relay 30 is in parallel with the relay 28 and in series with the relay 26.

Relay 26 is a typical thermostatically operated relay well known to those skilled in the art. Relay 28 is responsive to a relay coil 32 which is shunted across the motor 10. Thus, when motor 10 is operating, relay 28 is closed.

Relay 30 is normally closed. Relay 30 is responsive to a relay coil 34 which in turn is powered in response to pressure as sensed by a pressure sensitive device 36 in line 18. The relay 30 is thus operated in response to an environmental condition (i.e. pressure) sensed in the system. In this case, the environmental condition which is sensed and which operates the coil 34 is the high side or outlet pressure in the conduit 18 from the compressor 12.

The environmental condition which is sensed can also be the temperature of the motor 10, for example. As will be evident by later explanation, either one of these conditions or various other environmental conditions can be sensed to determine when the compressor or motor is operating in a normal manner under a normal load condition and when that load will have dropped below a predetermined level so that the motor 10 may be restarted without laboring.

The control circuit and power circuit are in parallel in the present description. However, each circuit may have its own independent power source so long as the interrelationship of the described relays is maintained.

The sequence of operation of the apparatus and circuits of the present invention is as follows. During normal operation, the thermostat 26 would close, thereby completing a circuit through coil 25 and the contacts of normally closed relay 30. The contacts of normally open relay 24 are thus closed and power is supplied to motor 10. After the relay 24 is closed and current passes through the motor 10 as well as through the shunt relay coil 32, the normally open contacts of the relay 28 close to provide an alternate path for current through the control circuit. When pressure on the high side of the compressor 12 reaches its normal operating value, this pressure is sensed by the device 36, causing the relay coil 34 to be activated. This, in turn, causes the relay contacts at 30 to open.

In the event that the control circuit is opened at the thermostat 26, for example, thereby opening the relay contacts 24, it will be impossible to restart the motor 10 until the high side or load pressure in the conduit 18 decreases below the threshold pressure that activates the relay coil 34. Thus, the control circuit through thermostat 26, relay coil 25 and relays 28 or 30 remains in an open condition until the start up load on the motor 10 is decreased below a fixed value.

In the event there is a failure in the power supply to the motor 10, the same control effect will be observed. That is, the relay coil 32 will be deactivated, thereby causing the relay 28 to open. Since the high side pressure in conduit 18 maintains the relay 30 in an open condition, the motor 10 cannot be started, even though the fault has been corrected in the power supply to the motor 10. Restart of motor 10 cannot occur until the pressure in the output conduit 18 is reduced below a threshold value.

As mentioned before, it is possible to utilize a temperature sensitive element in association with the motor or the compressor in order to control the relay 30. Thus, the motor 10 would run at a certain substantially fixed temperature under normal running conditions. Sensing of this temperature would open the relay 30. Unless and until the temperature in the motor decreases due to inoperativeness of the motor 10 so that the relay 30 assumes its normally closed position, the motor 10 cannot be restarted. Thus, it is contemplated that the scope of the invention shall include not only the subject matter as set forth in the following claims, but also the equivalents thereof.

What is claimed is:

1. A time delay contol circuit for a motor-compressor system to prevent recycling thereof, said system including a compressor, a compressor motor and means for supplying electric power to said motor including a normally open power relay in series with said motor, said control circuit comprising, in combination:
    thermostatically responsive relay means,
    first normally open relay means in series with said thermostatically responsive relay means, said first relay means operative to close whenever power is supplied to said motor, and
    normally closed environmental responsive relay means also in series with said thermostatically responsive relay means and in parallel with said first relay means, said environmental responsive relay means operative to open whenever the sensed environmental condition of said compressor differs from a predetermined non-operating condition,
    said control circuit operative to close said power relay whenever said thermostatically responsive relay and at least one of said other relays are closed.

2. The circuit of claim 1 including a relay coil shunted across said motor to operate said first relay means.

3. The circuit of claim 1 wherein said control circuit is in parallel with said power relay and motor.

4. The circuit of claim 1 wherein said environmental responsive relay means is a pressure operated relay sensitive to the output pressure of said compressor.

5. The circuit of claim 1 wherein said power relay is responsive to current in power relay control means, said power relay control means being in series in said control circuit with said relay means.

* * * * *